United States Patent
Wu

(10) Patent No.: US 10,377,109 B2
(45) Date of Patent: Aug. 13, 2019

(54) ELECTRIC CONDUCTOR COMBINED BY COMPOSITE CONDUCTOR AND ITS MANUFACTURING METHOD

(71) Applicant: Jeng-Shyong Wu, Hsin-Chu (TW)

(72) Inventor: Jeng-Shyong Wu, Hsin-Chu (TW)

(*) Notice: Subject to any disclaimer, the term of this patent is extended or adjusted under 35 U.S.C. 154(b) by 0 days.

(21) Appl. No.: 15/964,651

(22) Filed: Apr. 27, 2018

(65) Prior Publication Data

US 2018/0370188 A1 Dec. 27, 2018

(30) Foreign Application Priority Data

Apr. 28, 2017 (TW) .............................. 106114337 A

(51) Int. Cl.
| | | |
|---|---|---|
| *B21C 37/04* | (2006.01) | |
| *B32B 15/01* | (2006.01) | |
| *H01B 1/02* | (2006.01) | |

(52) U.S. Cl.
CPC .......... *B32B 15/017* (2013.01); *B21C 37/042* (2013.01); *B32B 15/01* (2013.01); *B32B 15/015* (2013.01); *H01B 1/023* (2013.01); *H01B 1/026* (2013.01)

(58) Field of Classification Search
CPC ..... B21C 37/04; B21C 37/042; B21C 37/047; B32B 15/01; B32B 15/015; B32B 15/017; C22C 21/00; C22C 26/00; H01B 1/02; H01B 1/023; H01B 1/026; H01B 5/105; H01B 11/06; H01B 11/1808; H01B 11/1895
USPC .................................. 174/126, 71 C, 102 R
See application file for complete search history.

(56) References Cited

U.S. PATENT DOCUMENTS

| | | | | |
|---|---|---|---|---|
| 2012/0267141 | A1* | 10/2012 | Kamiyama | ........... B21C 37/047 174/102 R |
| 2014/0102781 | A1* | 4/2014 | Gao | ....................... H01B 7/428 174/70 R |
| 2018/0087125 | A1* | 3/2018 | Ishida | ..................... C22C 38/14 |
| 2018/0374599 | A1* | 12/2018 | Yoon | ..................... H01B 1/023 |
| 2019/0077341 | A1* | 3/2019 | Kohori | ............... B60R 16/0207 |

* cited by examiner

*Primary Examiner* — Timothy J Thompson
*Assistant Examiner* — Guillermo J Egoavil
(74) *Attorney, Agent, or Firm* — Sinorica, LLC

(57) ABSTRACT

The invention discloses electric conductor combined by composite conductor and its manufacturing method; the electric conductor forms interface with same or different characteristics among each layer contact surfaces with same or different properties, such as mixture, crystals, alloy, oxysome, etc. When it is electrified, it produces kinds of same or different current effect, such as skin effect, eddy current, ring current, magnetic effect, heat effect, crowding effect, or combined effect which combines each above-mentioned effect; it will play special role and effect if applied on reserved equipment.

1 Claim, 8 Drawing Sheets

ELECTRIC CONDUCTOR COMBINED BY COMPOSITE CONDUCTOR AND ITS MANUFACTURING METHOD

TECHNICAL FIELDS

The invention relates to electric conductor combined by composite conductor and its manufacturing method; in accordance with the implement of the invention, the electric conductor forms interface with same or different characteristics among each layer contact surfaces with same or different properties, such as mixture, crystals, alloy, oxysome, etc. When it is electrified, it produces kinds of same or different current effect, such as skin effect, eddy current, ring current, magnetic effect, heat effect, crowding effect, or combined effect which combines each above-mentioned effect; it will play special role and effect if applied on reserved equipment.

Although there are many products that can produce above-mentioned single or simple effect, yet there are no such products like present invention that can produce electric effect or combined effect which combines above-mentioned effect to apply to products with more special purposes.

PRIOR ART

Although the Supperconductor Device for Shielding or Collecting Magnetic Field of United States Patent U.S. Pat. No. 3,331,041 has a discussion on shielding or collecting magnetic field, yet it doesn't refer to the topic on combined effect induced by interface like present invention.

U.S. Pat. No. 5,223,349 explains a product of compounding coils with material aluminium clad by copper which Al—Mg alloy as the core is clad by copper or copper allay; die core material used has a 15~30 degree and half angle traction to decrease 20% sectional area and it is easy to clad by coils; similarly, the prior art doesn't refer to forming the interface by adding base material like the invention to play an effective role, either.

FIG. 10, copper-clad aluminium conductor of U.S. Pat. No. 9,117,570 B2 and the method of compressing conductor, explains a sort of copper-clad aluminium conductor, compressing conductor (including cable of the copper wire and the method of manufacturing compressing conductor); copper-clad aluminium, compressing conductor and cable including copper-clad aluminium and the method of producing compressing conductor according to the embodiment of the invention may perform electric characteristics similar to conventional pure copper while it doesn't enlarge the diameter of external conductor and cable; even in narrow and small space, workers may install cable at a comfortable style and the space can be used effectively.

For the cooling installation 30 of United States Patent, through the installation of injecting inert gases under low temperatures, when inside conductor and outside conductor go through a copper wire, it can be drawn into copper-clad aluminium wire 10 with 30%~39% volume of copper through cable quadrant 40, and then the required shape and diameter of copper-clad aluminium wire 10 can be obtained; in the meanwhile, the cable quadrant 40 of the metal wire is set to wire coil box 43 with cylinder shape, and it can be fixed in wire coil box 43 through wire coil tip 45 which is a through-hole between wiring inlet 47 and wiring outlet 49.

SUMMARY OF THE INVENTION

It is newly adopted in the invention that each layer added base material and forming interface; it can be made according to requirements, properties and content adopted as well as final usage requirements; it can be produced according to processing condition, procedure, coefficient, or shrinkage ratio, etc.

Any type of added base material in the invention such as the first, second, third . . . , through extension, compression and contraction, can be made into wire with various diameters, or covered with insulator to be applied to various kinds of electrical equipment.

The raw base material of electric conductor combined by composite conductor in the invention is compressible, transformable and extensible which may be single or many kinds of conductive metal like aluminium or its alloy; it also can be non electrical conductor such as product combined by graphite powder, talcum powder, etc.

For the preferred embodiment pattern of the invention, it can preset processing condition, procedure, coefficient or contraction ratio, especially in forming same or different interface among material, producing kinds of same or different current effect, or combined effect combining with kinds of different effect so that it can be used to meet special requirements of preset electrical equipment.

BRIEFS DESCRIPTIONS OF THE DRAWINGS

FIG. 1 explains detailed structure of electric conductor combined by composite conductor referred to in the invention;

Figure 3:
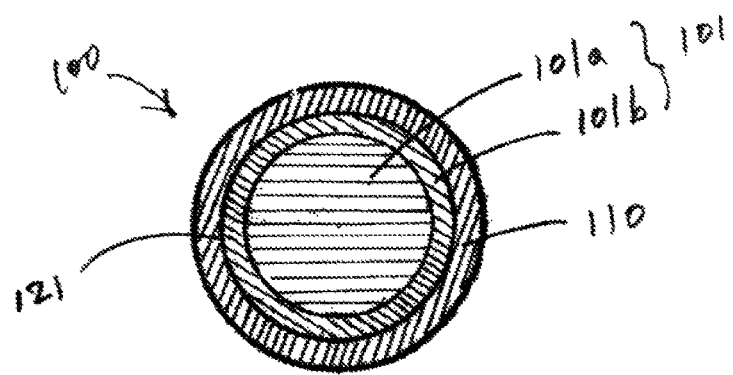
FIG. 3 is a cross section diagram of electric conductor constituted by raw base material and the first layer added material.
Figure 4:
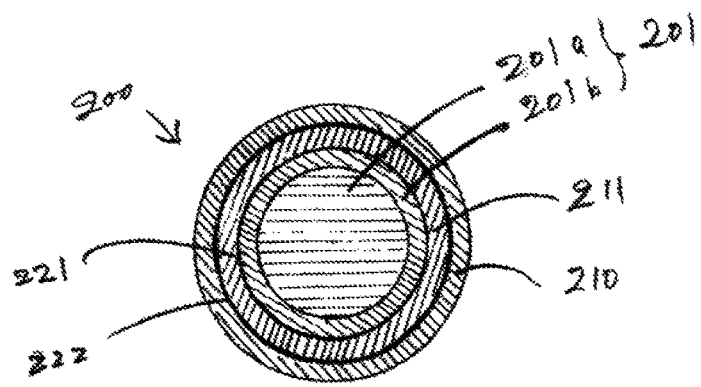
Figure 5:
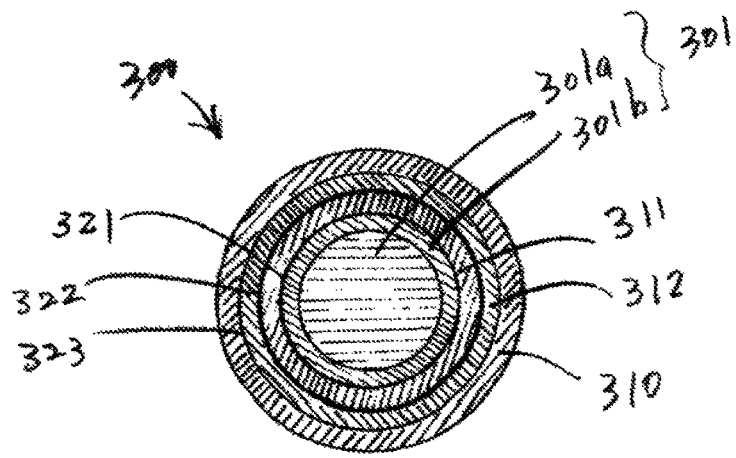
Figure 9B:
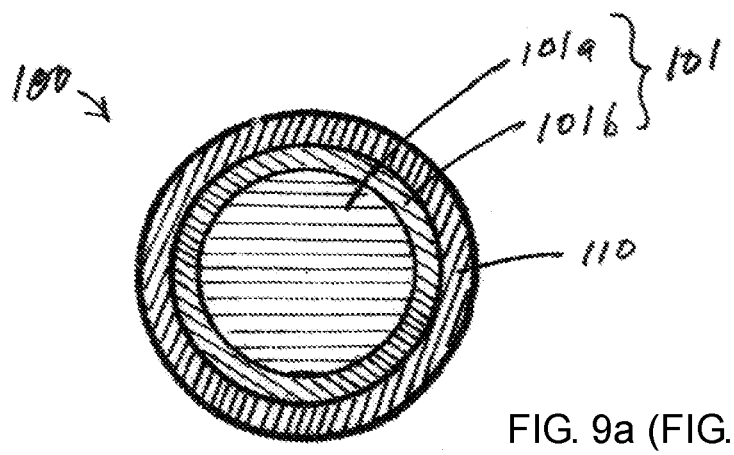
Figure 9B:
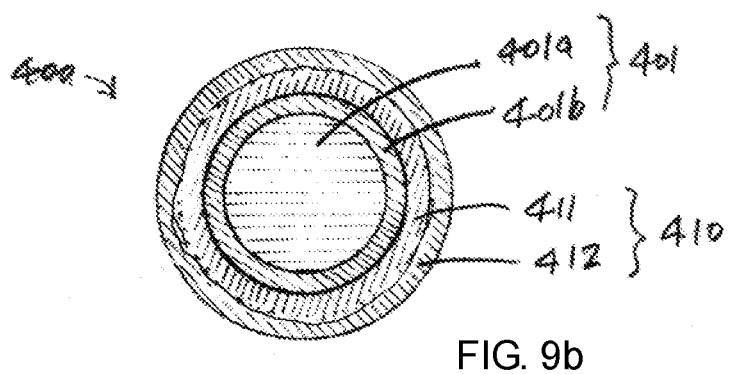
Figure 9C:
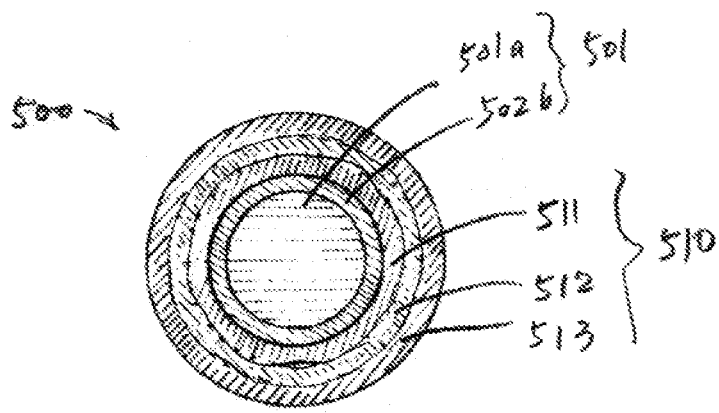
Figure 10:
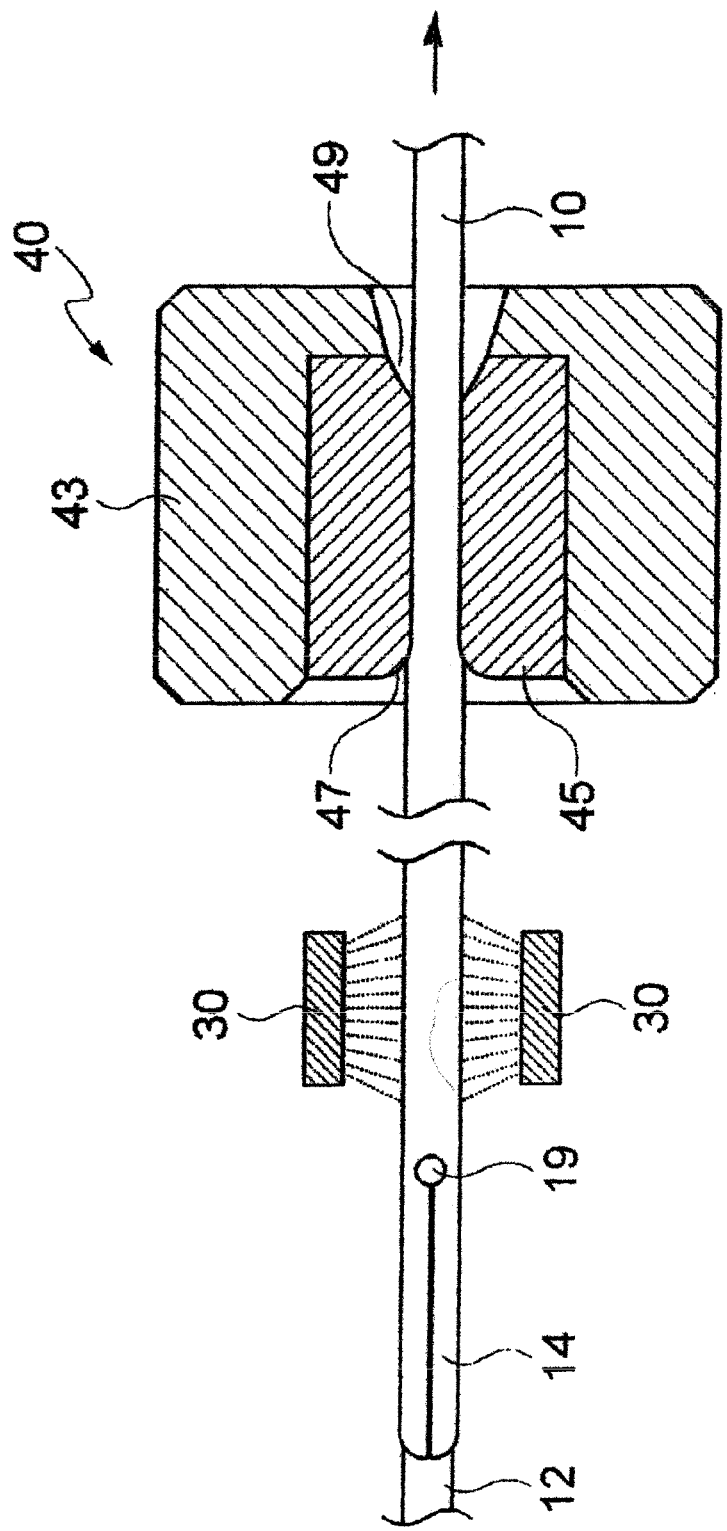

Compared with the electric conductor on the FIG. 3, FIG. 4 is a cross section diagram of electric conductor adding a second layer added material;

Compared with the electric conductor on the FIG. 4, FIG. 5 is a cross section diagram of electric conductor adding a third layer added material;

Based on the procedure of FIG. 6a to FIG. 6e, explains the mutual effect in compression and extension in the process of making electric conductor combined by composite conductor shown on FIG. 3;

Based on the procedure of FIG. 7a to FIG. 7e, explains the mutual effect in compression and extension in the process of making electric conductor combined by composite conductor shown on FIG. 4;

Based on the procedure of FIG. 8a to FIG. 8e, explains the mutual effect in compression and extension in the process of making electric conductor combined by composite conductor shown on the FIG. 5;

FIG. 9a to FIG. 9c explain that multiple layers added material twining the same conductor to make electric conductor; among them, FIG. 9a is the first added base material made on the basis of the first layer added material twining raw base material; FIG. 9b is the second added base material made on the basis of the second layer added material twining FIG. 9a of the first added base material; FIG. 9c is the third added base material made on the basis of the third layer added material twining FIG. 9b of the second added base material; and The FIG. 10 explains the electric conductor of U.S. Pat. No. 9,117,570 B2 and its manufacturing method.

DETAILED DESCRIPTION OF THE PREFERRED EMBODIMENT

Based on the drawings, it is detailed explains the electric conductor combined by composite conductor and its manufacturing method in the invention.

Figure 1:
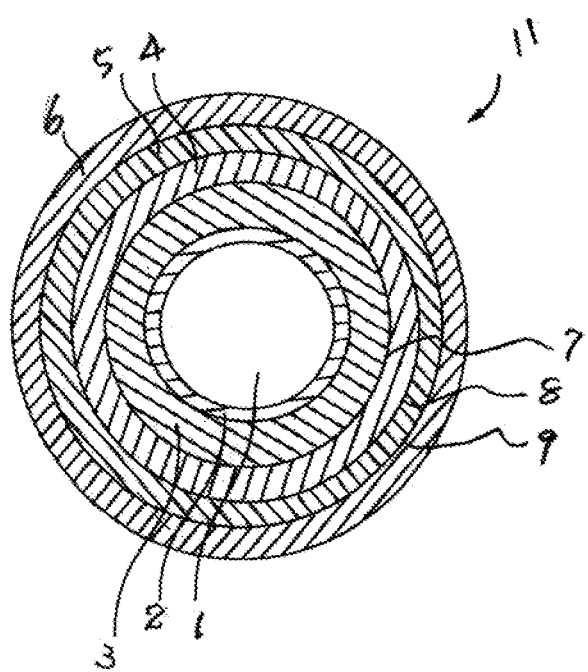

Seen from FIG. 1, it describes structure of the electric conductor in the invention; among them, innermost ring 1 is a long strip cylindrical raw base material; 2 is added material or seen unified as raw base material; 3, 4, 5 and 6 are added material; 7 is added material between interface 3 and 4; 8 is added material between interface 4 and 5; 9 is added material between interface 5 and 6; and 11 is the whole structure of the electric conductor in the invention.

Figure 2:
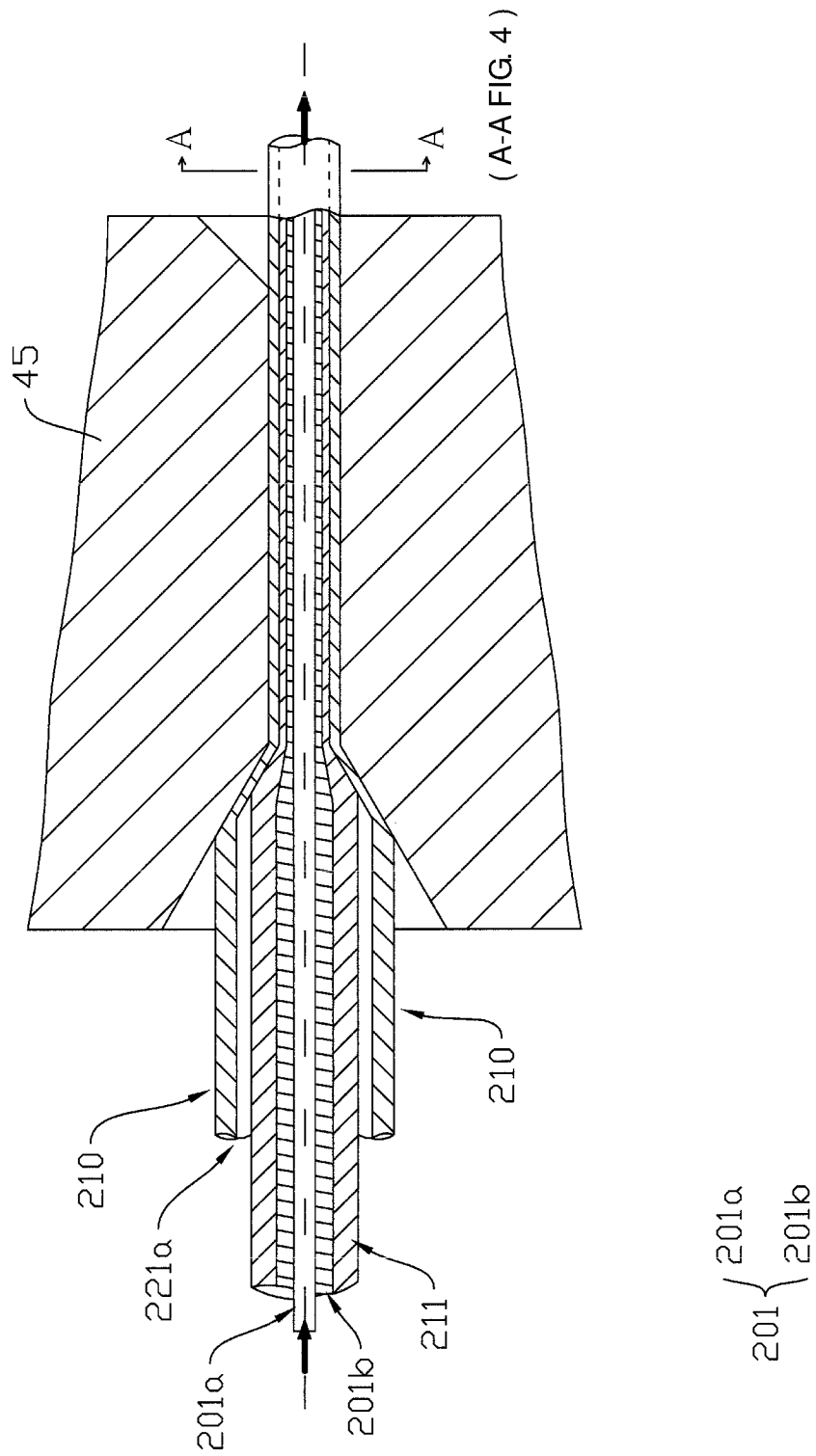
FIG. 2 is a sketch map of electric conductor combined by composite conductor drawn and pressed by wire drawing die 45, and seen in the direction of A-A section arrow on the right of the diagram, it is constituted that the sectional view shown on the FIG. 4 of the electric conductor in the invention.

Secondly, the FIG. 2 describes a wire drawing die which is used to manufacture electric conductor combined by composite conductor in the invention. In the diagram, the die 45 is set on compressing extension equipment; 201 contains raw base material after processed 201*a* and 201*b*; 211 is the first layer added base material; after processed combining with 201, it is the first added base material; 210 is the second layer added material combining with above-mentioned first added base material. It wholly clothes in ring the first added base material where there is a gap 221*a* between them; Gap 221*a* without pressing and extension by die 45 is pressed and extended in the direction of right of FIG. 2 arrow, and the gap 221*a* is nearly closed to form the interface between them, see FIG. 4 for details.

I.e. the A-A section of electric conductor after pressed and extended shown on FIG. 2 is also shown on the FIG. 4.

Hereinafter, based on FIGS. 3, 4 and 5, it is described in detail the structure of electric conductor 100, 200 and 300 in order.

The electric conductor combined by composite conductor 100 shown on the FIG. 3 contains raw base material 101, it can be inferred that 101*a* and 101*b* represent same or different material respectively; and the first layer added material 110 is wholly encircled based on the axis of raw basic material 101; there is a gap between contact surface; after pressed and drawn by die equipment, it forms interface 121 nearly without a gap; continue to press to preset external diameter, the first added base material (electric conductor) 100 is obtained.

Therefore, although there are two part numbers in electric conductor represented by No. 100 and the first added base material, yet they are the different descriptions in the part, just representing different functions, they are the same in principle.

And then the FIG. 4 of the descriptive schema; the section of the FIG. 4 is the same with that of A-A cross section on the FIG. 2 which is a the second added base material (electric conductor) combined by composite conductor 200, combining the first added base material (electric conductor) 100 and the second layer added material 210.

The second added base material (electric conductor) 200 on the FIG. 4 is more the second layer added material 210 than the first added base material (electric conductor) 100 on the FIG. 3; the second layer added material 210 is the axis of the first added base material (electric conductor) 100, which is wholly encircled; there is a gap between contact surface; after pressed and drawn by die equipment, it forms interface 221 nearly without a gap; continue to press to preset external diameter, the second added base material (electric conductor)200 is obtained.

In a similar way, front and back of number 200 also represents electric conductor and the second added base material are also a description of convenient parts in different stages; in principle it represents the same function in parts.

Similar to FIG. 3 and FIG. 4, the FIG. 5 describes electric conductor combined by composite conductor 300 including the second added base material (electric conductor) 200 and the third layer added material 310.

The third added base material (electric conductor) 300 combined by the composite conductor on the FIG. 5 is more a third layer added material 310 than the second added base material (electric conductor) 200 on the FIG. 4.

The third layer added material 310 on the FIG. 5 is wholly encircled on the basis of the axis of the second added base material (electric conductor) 200; although there is a gap between contact surface, after pressed and drawn by die equipment, it forms interface 320 nearly without a gap; continue to press to preset external diameter, the third added base material (electric conductor) 300 is obtained.

In short, Label 100, 200 and 300 represent electric conductor combined by composite conductor of each layer on the FIG. 3, FIG. 4, and FIG. 5 respectively; 101 including 101*a* and 101*b* represents raw base material to get same or different material; while 110, 210 and 310 are the first, second and third layer added material respectively.

Although it is the same raw base material for FIG. 3, FIG. 4, and FIG. 5 of 101, 201 and 301, the result is 101>201>301 for that it is pressed and extended, and the external diameter or area is decreasing.

Similarly, although 110, 211 of FIG. 3 to FIGS. 5 and 311 represent the first layer added material, the result is 110>211>311 for that it is pressed and extended, and the external diameter or area is decreasing.

Similarly, 210 of FIG. 4 and 312 of FIG. 5 are all represent the second layer added material, the result is 210>312, for that it is pressed and extended, and the external diameter or area is decreasing.

In the invention, from Interface 121, 221 and 321 of FIGS. 3 to 5, the factors such as the material of both sides, processing method, procedures and parameters form same or different organization, component and status such as changes of mixture, crystal and alloy to play the same or different current effect in specific equipment.

It will be detailed about the special effect and application of the electrical conductor that can be applied to the predetermined equipment in following items. It is different from the learned technology, such as U.S. Pat. No. 9,117,570 B2, which is only limited to the single effect or simple product of the invention.

Figure 6A:
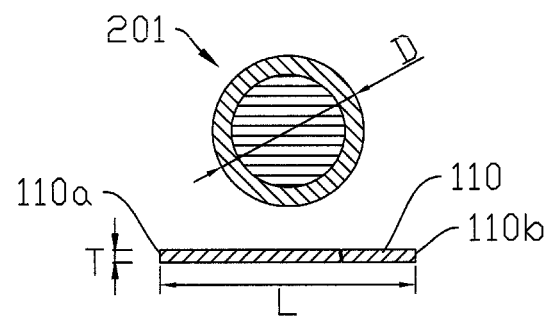

In FIG. 6*a*, the raw base material 201 is a long column with limited length, outer diameter rim, single material or compound material, also a conductor or nonconductor which has the characteristics of compression or extension.

The first layer added material 110 is a striped electric conductor with unlimited length, width L that is determined on the outer diameter or perimeter of the raw base material 201, thickness T, that is dependent on the content ratio of the preset materials, while in principle, it should not exceed the suitable range of processing.

Both ends 110*a* and 110*b* of the first layer added material 110 fully covered raw base material 201 in the direction of axis.

Figure 6B:
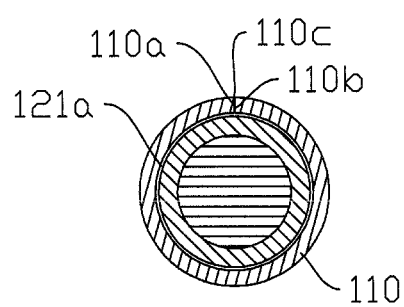

From FIGS. 6*a* to 6*b*, connect both ends 110*a* and 110*b* of the first layer added material to produce the gap 110*c*, which is connected through the welding.

In FIG. 6b, there is a gap at a loop section 121 which is between the raw base material 201 and the first layer added material 110. Through processing of pressing by die equipment, the first layer added material 110 which is between 110a and 110b and Gap 110c and Interval 121a are nearly disappeared. Its diameter is slightly smaller than D+2T.

Figure 6C:
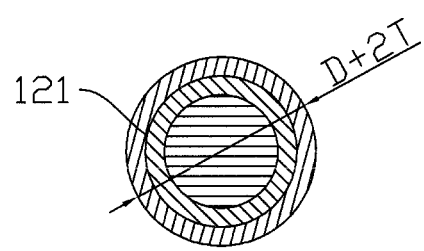
Figure 6D:
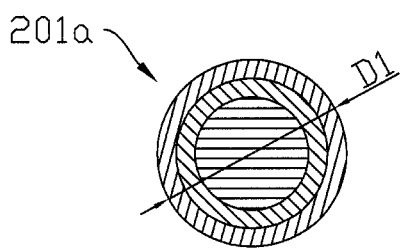
Figure 6E:
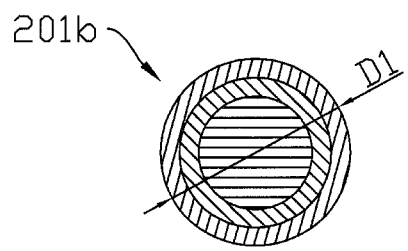

FIG. 6c is a diagrammatic sketch both ends 110a, 110b of the first layer added material 110 and Gap 110c and Interval 121a on FIG. 6b disappeared after processed by die. In other words, FIG. 6c is an interface 121 occurred between the raw base material and the first layer added material 110. FIG. 6c is compressed, extended or heated by die equipment to the preset diameter of D1. The preset diameter D1 and preset is equal to the raw base material 201 external diameter D plus two times the thickness 2T of the first layer added material 110. It becomes the first added material 201a, added the second time according the the procedure of FIG. 6e as shown on FIG. 6d. Or continue to reduce line diameter according to preset to the preset specifications, as shown in FIG. 6d and FIG. 6e.

The proportion of all the above material depends on the amount of materials used, and the compression ratio does not affect the proportion of the preset materials in principle.

In the use of material, it is dependent on requirements to use the preset equipment. Considering the differences among material types, characteristics, components, and the amount, the characteristics of the composition when it is electrified can be gotten and be applied to the preset equipment The label 201a of FIG. 6d is the same as the first layer added material 110, and thickness T is narrowed by the eye. The label 201b on FIG. 6e is an electric conductor which is narrowed in thickness from 201a; The D1 on FIG. 6e indicates that its outer diameter is narrowed to be preset use wire size.

According to the process of inventing and manufacturing electric conductor on FIGS. 6a to 6e, there is forming interface with same or different characteristics, such as mixture, crystal, alloy, oxysome, etc. When it is electrified, the same or different electricity effect will be occurred, such as skin effect, eddy current, ring current, or magnetic effect, heat effect, crowding effect, or combined effect which combines each above-mentioned effect, it should be applied to play special role and effect on reserved equipment.

The known technique such as U.S. Pat. Nos. 3,331,041, 5,223,349 or 9,117,570 B2, although they can produce above-mentioned single or simple effect, yet there are no such products like the invention that can produce electric effect or combined effect which combines above-mentioned effect to apply to products with more special purposes.

That is, the manufacturing process on FIGS. 6a to 6e make the electric conductor combined by composite conductor 100 shown on FIG. 3.

Next, the process of FIGS. 7a to 7e is drawing electric conductor combined by composite conductor 200 shown on the FIG. 4.

Label 201a is the first added material, namely the second time added base material; Label 210 is the second layer added material, and both ends are label 210a and 210b respectively; Label 210c represents gap of the second layer added material 210; Label 222 is the gap between original 201a before extended and pressed and 210, and 222 is the interface after pressed and extended; Label 221 is the interface 121 on the originalfig. 6c; Label 202 is the second added base material, and the Label 202b is a narrowed second added base material.

With the same process in FIGS. 6a to 6e, and there formed interfaces with the same or different characteristics, in the contact surfaces with the same or different material. Under such conditions such as preserving original interface structure, or different structures, add another process at the Interface 121 which is between the first layer added material 110 and raw base material 201, through processing according to die, and then get two layer interfaces such as 121 (or 221) and 222. When it is electrified, there will produce more same or different current effect or composite effect to play special effects applied to preset equipment.

Figure 7A:
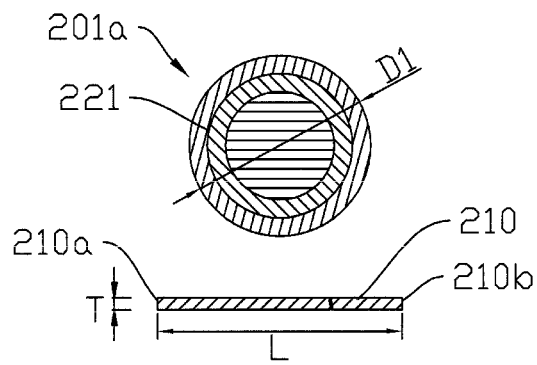
Figure 7B:
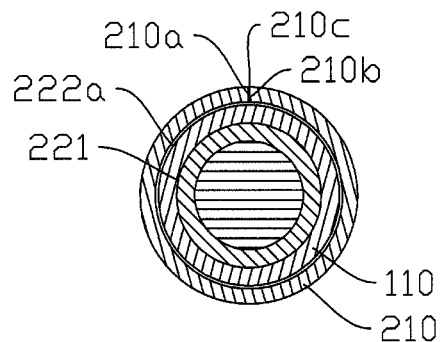
Figure 7C:
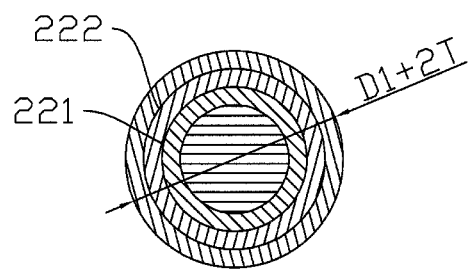
Figure 7D:
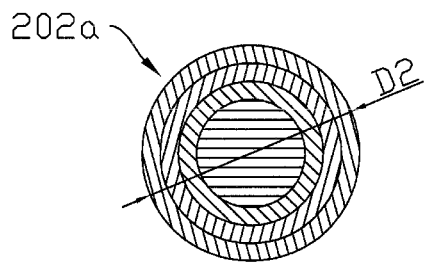
Figure 7E:
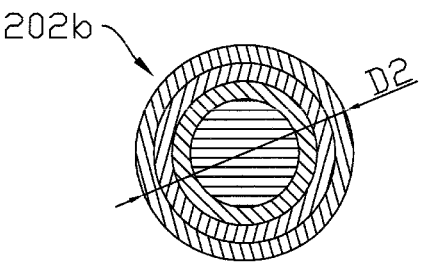

There is a diameter of Label D2 on the second added base material 202a of FIG. 7d pressed and extended by die; although there is a narrowed diameter on the second added base material 202b in FIG. 7e, it is also shown by Label D2.

Similarly, the manufacturing process on FIGS. 8a to 8e is the electric conductor combined by composite conductor 300 shown in FIG. 5.

Figure 8A:
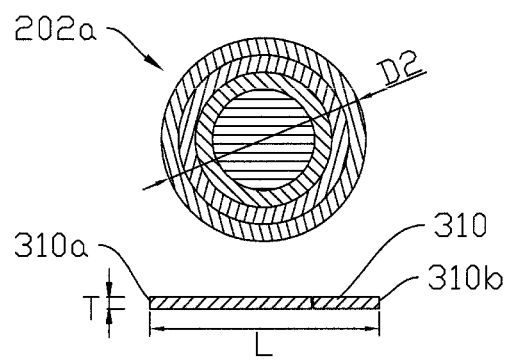
Figure 8B:
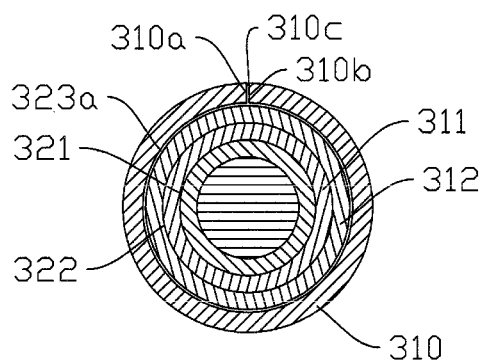
Figure 8C:
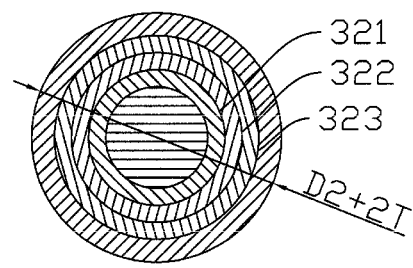
Figure 8D:
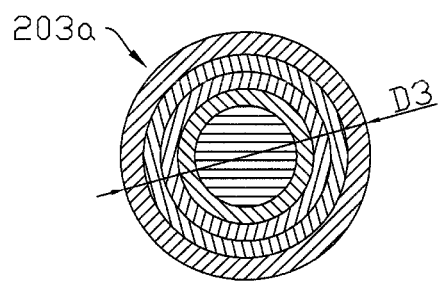
Figure 8E:
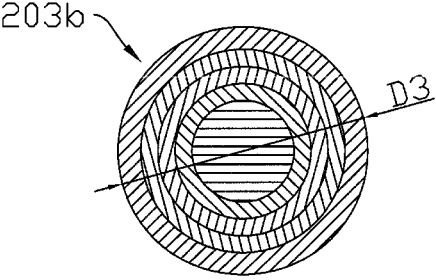

Label 202a in FIG. 8a is the second added material, namely the third time added base material; Label 310 is the third added material of which both ends labeled 310a and 310b; Label 310c represents a gap of the third added material; Label 323a is a gap before extended and pressed, while Label 323 is a interface after pressed and extended; Label 322 is interface of Label 222 in original FIG. 7c, while Label 321 is Interface 221 in original FIG. 7a and Interface 121 in original FIG. 6c; Label 203a is the third added base material, original label 203b is the third added material of narrowed diameter.

In FIGS. 8a to 8e, after processed by die in FIGS. 6a to 6e and FIGS. 7a to 7e, Interface 321,322 and 323 with same or different characteristics are formed among same or different material contact interface. The interfaces with the same or different characteristics are formed at 321, 322 and 323 among the same or different materials. Under such conditions such as preserving original interface structure, or different structures, add another process at the Interface 322 which is between the second layer added material and the first added base material, and form special interface 323 between the third layer added material and the second added base material. When it is electrified, there will produce more same or different current effect or composite effect to play special effects applied to preset equipment.

It is worth noting that it forms special structure of any layer added base material after adding each layer of it to continue use various forms. For example, (A) is used as wire and cable to demonstrate through pressing and extending the first, second and third added material into thin-wire or covered with insulation. (B) indicates that according to requirements of characteristics, using target needs, cut the first, second and third added base material into structural style to produce its special characteristics in the process of current in or out so as to design its special purpose.

In the field of R & D, the shortcomings of products may play a special role if it is used properly. It may be used in optoelectronics, semiconductors, or LED. The conductive material of the invention has varied structure, and has infinite space for inventive effect.

In FIGS. 9a, 9b and 9c, it shows there are same conductors with multiple layers added material in the invention.

FIG. 9a shows that the first added base material (electric conductor) 100 is processed by the first layer added material 110 added on raw base material 101 which is the same or different with FIG. 3 or FIG. 6a depended on preset requirements. For example, when there is a difference of property between the first layer added material 110 and raw base material 101 (among them, the raw base material is combining 101a and 101b), e.g. 110 for copper, 101 for aluminium, add 110 and 101 to form 121, namely becoming the first added base material (electric conductor)100 in accordance with aforementioned procedure.

In FIG. 9b, it indicates that the second layer added material 412 is added to the first added base material on above mentioned FIG. 9a; the property of composite material 410 on FIG. 9b is 412, the same with 411 (original 110 contracted); for instance, copper becomes the second added base material (electric conductor) 400 in accordance with aforementioned procedure. Among them, 401 is 101 after contracted, and 411 is 110 after contracted; it is the same or different due to factors of processing in original interface 121.

In FIG. 9c, it indicates that the third layer added material 513 is added to the second layer added base material (electric conductor) 400 on above-mentioned FIG. 9b. The property of 513 on FIG. 9c is the same with 512 (original 412 contracted); for instance, copper becomes the third added base material (electric conductor) 500 in accordance with aforementioned procedure. Among them, 501 is 401 after contracted, and 511 is 411 after contracted; it is the same or different due to factors of processing in original interface 121.

The property of the first, second and third added material 511, 512 and 513 is same, in accordance with the processing in FIG. 9a (100), FIG. 9b (400) and FIG. 9c (500), the interfaces among them nearly disappeared and tightly combined after processed. For combination of the whole copper, sectional area of outer layer 510 is the sum of 511, 512 and 513; namely sectional area 501 is the addition of 501a and 501b. For aluminium, add with 510 (i.e. sum of 511+512+513) like copper; it is known to review the application amount and contraction percentage of each material. It is detailed in following application pattern.

In this implementation, copper ration in material of aluminium clad by copper can be solved, namely copper ration is increasing step by step; produce material with a series of different percentage to meet the requirements of using in various of finished products.

The material of aluminium clad by copper is increasing step by step in the invention; it can refer to preferred embodiment:

Preset: the unit of the sectional area of raw base material is A;

The unit of the sectional area of added material is B, C, D . . . for the first time, second time, third time . . . .

Contraction percentage of sectional area when processing is $X_1, X_2, X_3 \ldots \%$.

The first layer adding, A+B clad, unit of sectional area A+B,

Contraction percentage of sectional area is $X_1\%$,

It is can be obtained that the first added base material is $AX_1+BX_1$ unit

The second layer adding, $(AX_1+BX_1)+C$ unit,

Contraction percentage of sectional area is $X_2\%$,

It is can be obtained that the second added base material is $AX_1X_2+BX_1X_2+CX_2$ unit The third layer adding, $(AX_1X_2+BX_1X_2+CX_2)+D$ unit, Contraction percentage of sectional area is $X_3\%$, It is can be obtained that the third added base material is $AX_1X_2X_3+BX_1X_2X_3+DX_3$ unit Adding the fourth layer . . . :

$AX_1X_2X_3X_4+BX_1X_2X_3X_4+CX_2X_3X_4+DX_3X_4+EX_4$ unit,

The formula can be obtained in accordance with its procedures, and the sectional ration of each layer and each material is computed.

The added base material of each layer above-mentioned continues to contract; it is found that the sectional area ratio of each layer is same.

Also, embodiment pattern is set as follows:

According to above formula:

Setting: A=85 unit; B=15 unit; A+B=100 unit;

B=C=D=E= . . . =15 unit;

the contraction ratio of sectional area is: $X_1=X_2=X_3=X_4= \ldots =85\%$.

It can be obtained according to procedures:

The first added base material is $AX_1+BX_1=85\times0.85+15\times0.85=85$ unit;

sectional area ratio A:B=85:15

The second added base material is $AX_1+BX_1=AX_1X_2+BX_1X_2+CX_2=85\times0.85\times0.85+15\times0.85\times0.85+15\times0.85$;

sectional area ratio A:B:C=72.25:12.75:15.

The third added base material is $AX_1X_2X_3+BX_1X_2X_3+CX_2X_3+DX_3,=85\times(0.85)^3+B\times(0.85)^3+C\times(0.85)^2+D\times0.85$ sectional area ratio A:B:C:D=61.41:10.84:12.75:15.

The sectional ratio of each material A, B, C and D of each layer is computed in order.

If added base material of each layer continues to contract, each sectional area ratio of each layer is same.

In addition, embodiment pattern is set as follows:

According to above setting and formula:

When the property of each added base material set is same:

Original A:B=85:15, when property of added base material B, C, D, E . . . is same, sectional area contraction ratio=$X_1=X_2=X_3=85\%$;

The first layer processing is A+B, $A:B=AX_1:BX_1=85:15$,

If continues to contract, its sectional area ratio is same, namely the first layer base material.

The second layer processing is A+B+C, $AX_1X_2:BX_1X_2:CX_2=85\times0.85\times0.85:15\times0.85\times0.85:15\times0.85$, the property of B and C is same; after adding it is $B_1$, $A:B_1=72.25:(12.75+15)=72.25:27.75$, namely the second layer base material.

The third layer processing is A+B+C+D $AX_1X_2X_3:BX_1X_2X_3:CX_2X_3:DX_3=85\times(0.85)^3+15\times(0.85)^3+15\times(0.85)^2+15\times0.85$ the property of B, C and D are same; after adding, it is $B_2$, $A:B_2=61.41:(10.84+12.75+15)=61.41:38.59$, it is the third layer base material.

The sectional ratio of each material A, B, $B_1$, $B_2$, $B_3$ . . . of each layer is computed in order.

REFERENCE NUMERALS OF THE PARTS

FIG. 1

1 raw base material 2 added material or seen unified as raw base material 3 added material 4 added material 5 added material 6 added material 7 interface 8 interface 9 interface 11 the whole structure of the electric conductor in the invention FIG. 2
45 die
201(201*a*, 201*b*) raw base material (same or different material)
FIG. 9*a*
101(101*a*, 101*b*) raw base material (same or different material)
FIG. 9*b*
401(401*a*, 401*b*) raw base material (same or different material)

What I claimed is:

1. A conductor structure comprising:
a center cylindrical body;
a first sleeve body;
a second sleeve body;
a third sleeve body;
a fourth sleeve body;
a fifth sleeve body;
the first sleeve body enclosing the center cylindrical body;
the second sleeve body enclosing the first sleeve body;
the third sleeve body enclosing the second sleeve body such that a first gap is formed in between the second sleeve body and the third sleeve body;
the fourth sleeve body enclosing the third sleeve body such that a second gap is formed in between the third sleeve body and the fourth sleeve body;
the fifth sleeve body enclosing the fourth sleeve body such that a third gap is formed in between the fourth sleeve and the fifth sleeve body;
the second sleeve body and the third sleeve body being tightly pressed against each other by the first gap being substantially minimized;
the third sleeve body and the fourth sleeve body being tightly pressed against each other by the second gap being substantially minimized;
the fourth sleeve and the fifth sleeve body being tightly pressed against each other by the third gap being substantially minimized;
the center cylindrical body being made of graphite; and
the first sleeve body, the second sleeve body, the third sleeve body, the fourth sleeve body and the fifth sleeve body being made of aluminum or copper.

* * * * *